(12) United States Patent
     Pasykov

(10) Patent No.: US 12,572,691 B1
(45) Date of Patent: Mar. 10, 2026

(54) ONLINE MATCHING SYSTEM PARTICULARLY ADAPTED FOR CELL PHONES WITH THROWBACK, AUTOMATIC BLURRING AND UNBLURRING OF PROFILE PHOTOGRAPH, AND SELECTIVE DISCLOSURE OR NON-DISCLOSURE OF PRIVATE INFORMATION FOR INCREASED CHANCES OF MATCHING

(71) Applicant: SOCIAL IMPACT INC., Wilmington, DE (US)

(72) Inventor: Oleksandr Pasykov, Sharjah (AE)

(73) Assignee: SOCIAL IMPACT INC., Las Vegas, NV (US)

( * ) Notice: Subject to any disclaimer, the term of this patent is extended or adjusted under 35 U.S.C. 154(b) by 34 days.

(21) Appl. No.: 18/503,999

(22) Filed: Nov. 7, 2023

(51) Int. Cl.
     *G06F 21/62* (2013.01)
     *G06Q 50/00* (2024.01)
     *H04M 1/72436* (2021.01)

(52) U.S. Cl.
     CPC ......... *G06F 21/6245* (2013.01); *G06Q 50/01* (2013.01); *H04M 1/72436* (2021.01)

(58) Field of Classification Search
     CPC . G06F 21/6245; H04M 1/72436; G06Q 50/01
     See application file for complete search history.

(56) References Cited

U.S. PATENT DOCUMENTS

| | | | |
|---|---|---|---|
| 7,917,448 | B2 | 3/2011 | Smola et al. |
| 8,407,093 | B2 | 3/2013 | Cartmell |

| | | | |
|---|---|---|---|
| 8,478,728 | B2 | 7/2013 | Villa et al. |
| 8,812,519 | B1 | 8/2014 | Bent |
| 9,158,821 | B1 | 10/2015 | Quisel et al. |
| 10,387,417 | B1 | 8/2019 | Hansen et al. |
| 10,489,445 | B1 | 11/2019 | Carter et al. |

(Continued)

FOREIGN PATENT DOCUMENTS

| | | |
|---|---|---|
| KR | 101609710 B1 | 4/2016 |

*Primary Examiner* — Clayton R Williams
(74) *Attorney, Agent, or Firm* — KLEMCHUK PLLC

(57) ABSTRACT

Methods and systems for online matching between user pairs, e.g., user-1 and user-2, where the initiating condition for all subsequent steps and functions is a negative preference for one of the users to the other. The methods and systems allow user-1 to review user profiles where user-1 previously indicated a negative preference, in both a scenario where user-2 indicates a positive preference for user-1 and a scenario where user-2 does not indicate any preference for user-1. The method and system also allow for displaying a first user's profile photograph unblurred to the second user in a list of other user's profile photographs, which are partially blurred, when the server determines that the predetermined condition for the system to automatically remove the blurring is met. The methods and systems also allow for portion(s) of a user profile (such as private cards) to be selectively indiscernibly blurred (or otherwise rendered inaccessible) to enhance the ability to disclose more information about themselves for viewing by selected other users while maintain privacy of those portion(s) until conditions are met, including the presence of an instruction to do by the user whose profile it is, by which the blurred portions can be unblurred to another user.

23 Claims, 6 Drawing Sheets

(56) References Cited

U.S. PATENT DOCUMENTS

| | | | | |
|---|---|---|---|---|
| 10,548,001 | B1 * | 1/2020 | Shelley | H04L 51/10 |
| 10,887,270 | B1 * | 1/2021 | Adamski | G06T 3/18 |
| 11,102,178 | B2 | 8/2021 | Ding et al. | |
| 11,425,213 | B2 | 8/2022 | Rad | |
| 11,483,276 | B2 | 10/2022 | Adamski et al. | |
| 2005/0027707 | A1 | 2/2005 | Syed | |
| 2010/0306249 | A1 | 12/2010 | Hill et al. | |
| 2011/0219310 | A1 | 9/2011 | Robson | |
| 2015/0032504 | A1 * | 1/2015 | Elango | G06Q 30/0201 |
| | | | | 705/7.29 |
| 2015/0379603 | A1 * | 12/2015 | Gupta | G06Q 30/0617 |
| | | | | 705/26.43 |
| 2016/0248864 | A1 | 8/2016 | Loia et al. | |
| 2017/0337652 | A1 | 11/2017 | Sarin | |
| 2019/0239038 | A1 | 8/2019 | Bhat | |
| 2022/0148097 | A1 | 5/2022 | Miller et al. | |
| 2023/0118533 | A1 * | 4/2023 | Benchetrit | G06Q 50/01 |
| | | | | 705/319 |

* cited by examiner

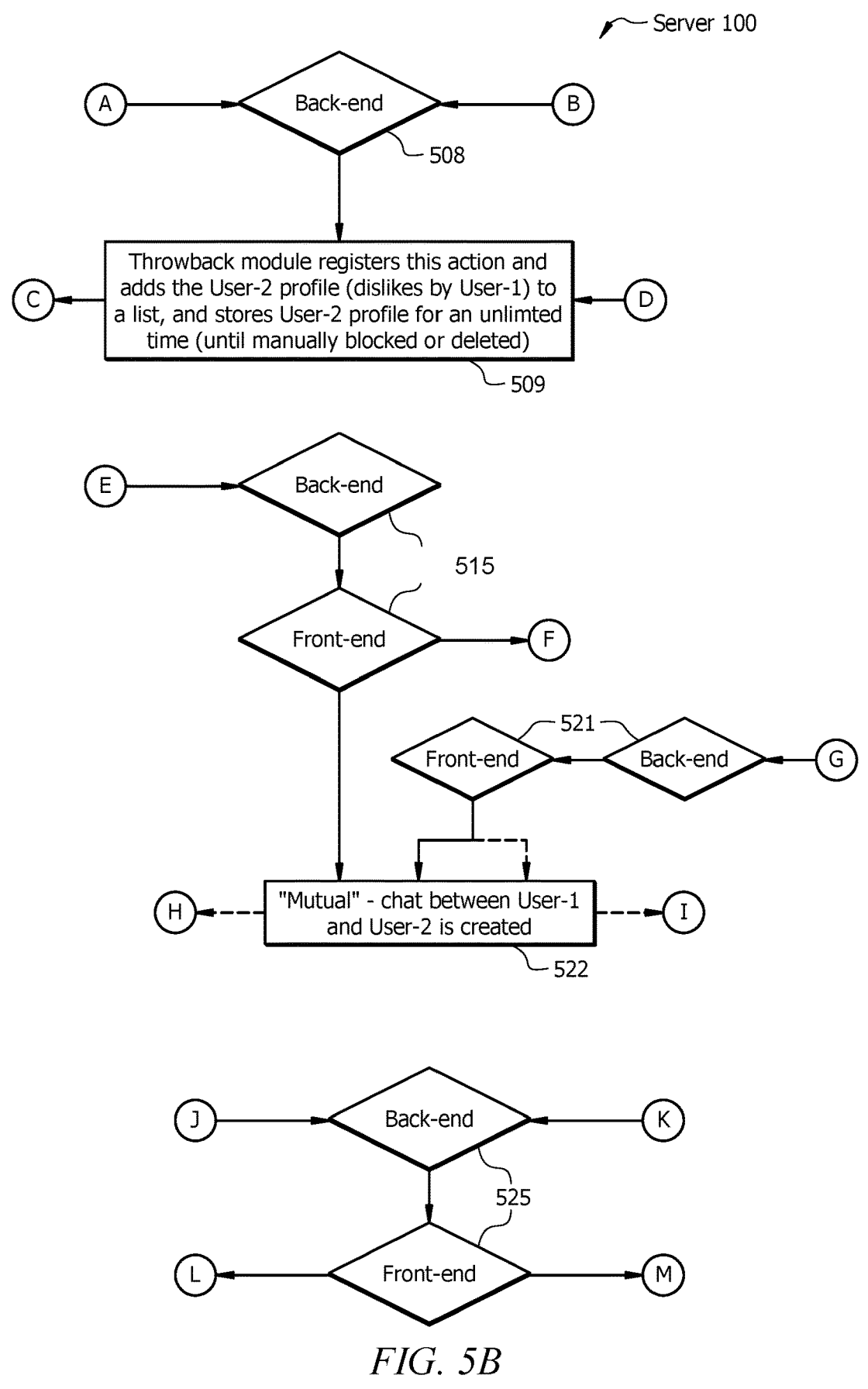

Server 100

(A) → ◇ Back-end ← (B)
508

↓

(C) ← | Throwback module registers this action and adds the User-2 profile (dislikes by User-1) to a list, and stores User-2 profile for an unlimted time (until manually blocked or deleted) | ← (D)
509

(E) → ◇ Back-end
515

↓

◇ Front-end → (F)

◇ Front-end ← ◇ Back-end ← (G)
521

↓

(H) ⇠ | "Mutual" - chat between User-1 and User-2 is created | ⇢ (I)
522

(J) → ◇ Back-end ← (K)
525

↓

(L) ← ◇ Front-end → (M)

*FIG. 5B*

ONLINE MATCHING SYSTEM PARTICULARLY ADAPTED FOR CELL PHONES WITH THROWBACK, AUTOMATIC BLURRING AND UNBLURRING OF PROFILE PHOTOGRAPH, AND SELECTIVE DISCLOSURE OR NON-DISCLOSURE OF PRIVATE INFORMATION FOR INCREASED CHANCES OF MATCHING

FIELD OF THE DISCLOSURE

This disclosure relates generally to a particular manner of controlling presentation of information in electronic devices and has particular application to online matching systems, and most particularly, to a matching system application launched from a computing device having relatively limited computing power and having a relatively small user interface, such as a cell phone or tablet.

BACKGROUND

Online matching computer systems and applications, including those launched from a computing device having a relatively small user interface and limited computational power, such as a cell phones and tablets, can generally operate based on profiles created by users and preferences indicated among a plurality of users for one another's profiles. In such computer systems, once a negative preference is indicated by one user for another, the users generally cannot view the profile of the other again. However, the present inventors have determined that, sometimes, the negative preference could be due to a particular timing in the user's schedule, mood, or perception; where, under other circumstances at another point in time, the user might have indicated a positive preference for the other user. Moreover, users may omit certain information added to profiles on online matching services and systems because of privacy concerns, limited computing power and screen size, and also because of a perception that it will improve their chances of being spotted and by other users and developing a connection with them. However, the present inventors have determined that, for certain other users, the information omitted by a user from their profile may have created a positive impression on certain other users and its omission reduces the chances of a match for those certain other users.

Online matching computer systems and applications of the prior art are sometimes provided with a short free introductory period, such as a month, followed by payment of fees, such as monthly fees, thereafter. However, because many users are reluctant to provide their payment information, such as a credit card number, up front, some potential users never subscribe, even for the free introductory period. Furthermore, for those that do subscribe, the free introductory period is often insufficient for the user to determine the value of the application ("app"), and many drop out without ever transitioning to a fee-bearing subscription.

For cell phones and tablet type devices, it is common for developers of many types of apps to provide their apps with a basic functionality without charge, often for a much longer period of time than one month, or even without a time limit. Many users have come to expect this for cell phone and tablet apps.

The foregoing user expectation is problematic for matching computer systems applications. The goal of a matching computer system and app is to provide users with a desired "match" in as short a period of time as possible. However, after such a match is achieved, the matched users generally choose to discontinue using the app, or a long period of time, if not permanently. When such a matching app is provided without charge for an extended period of time, many matches will occur during the period of time that the matching app has been provided without charge. The longer the period of time the app is provided without charge, the more likely a user will achieve a match in the no-charge period. This can make it impractical to provide a matching app for an unlimited period, or even a long enough introductory period for the user to determine the value of the app, without imposing periodic fees.

OBJECTS OF THE INVENTION

There is a need to give users of online matching services and systems improved options for achieving a match more quickly and reliably, particularly with applications launched from a computing device having relatively limited computing power and having a relatively small user interface, such as a cell phone or tablet.

It is also an object of the invention to provide a matching app that can practically be provided with a basic level of functionality, without a periodic fee, by partially blurring the profile photograph of a user choosing the basic level of functionality, which partial blurring will be removed upon the user choosing a higher level of functionality, or automatically by the server, upon the server determining the occurrence of a predetermined condition, regardless of the level of functionality selected by the user.

SUMMARY OF THE INVENTION

In accordance with some aspects of the present invention, to overcome the impracticality of providing a matching app without charge for an extended or unlimited period, or even a period of time long enough for the average user to determine the value of the app, a basic level of functionality can be provided, even without charge, the user's profile photograph can be displayed on the screen of other users' devices as partially blurred. The partial blurring is preferably not so extensive as to render the photograph completely undiscernible. Rather, the degree of partial blurring can be a lesser amount; roughly equivalent to what a person with 20:40 vision would see, as compared to the equivalent of what a person with 20:20 vision would see when unblurred. Alternatively, the extent of the partial blurring can be somewhat greater, within ranges of having vision equivalent to 20:21 to 20:30; 20:31-20:40; 20:41 to 20:50; 20:51 to 20:60; 20:61 to 20:70; or even more blurred than 20:70 vision, but not so blurred as to make the profile photograph undiscernible.

The present inventors have determined that, even with partially blurring of the profile photograph, as described, most other users will still be able to discern enough from the blurred photograph, particularly in conjunction with other profile information that is not kept private, to determine whether or not to send a "like," to request a chat or otherwise express initial interest. As such, a user (using a basic level of functionality) can still effectively use the matching app, despite the user having a partially blurred profile photograph.

Nevertheless, in terms of likelihood of achieving a match in a given period of time, a user having a blurred profile photograph is still at a disadvantage as compared to users whose photographs are not partially blurred, such as those users who elected to have a higher level of functionality Furthermore, this difference in effectiveness in achieving a match for having a blurred vs. and unblurred profile photograph creates an incentive for a user having the lower, basic level of functionality to upgrade to a higher level or functionality that would be more likely to generate a match.

Some users, by reason of one or more factors, take longer to achieve a match than the average user. When such more-difficult-to-match users elect to stay on the basic level of functionality, despite the disadvantage of having a blurred profile photograph, the blurred photographs of those more-difficult-to-match users may continue to be repetitively displayed to other users many times without achieving a match. This is disadvantageous for the more-difficult-to-match users because their blurred profile photographs already put them at a disadvantage compared to other users who do not have a blurred profile photograph, all other things being equal, as regards the likelihood of achieving a match in a given period of time. Furthermore, it is also disadvantageous for other users, because screen space and screen time for other users to review users' profile photographs is limited, particularly on small screen devices, such as cell phone and tablets.

The present inventors have determined that, because of these effects, left unchecked, the proportion of repetitive display of more-difficult-to-match users having partially blurred photographs can tend to grow as compared to other users who are less-difficult-to-match and do not have blurred profile photographs. This makes the user experience less satisfactory, and achieving a match more time consuming, for all users, with more server processing required to provide fewer matches, with more required clicks by users, and with greater consumption of battery power by battery-powered devices such as cell phone and tablets.

To alleviate these problems, in an embodiment of the present invention, the system will automatically reduce or eliminate entirely the partial blurring of a more-difficult-to match users' profile photograph, upon the occurrence of a predetermined condition or conditions. In general, the predetermined condition or conditions are those that indicate that a particular user is significantly more-difficult-to-match than the average user, even though that user has not elected the higher level of functionality that entitles them to have their profile photographs displayed on other users' devices unblurred.

For example, in an exemplary embodiment, the predetermined condition can be: (1) the passage of a predetermined amount of time without a match; (2) the passage of a predetermined amount of time without receiving a positive preference, such as a "like" or a "Rainbow Like;" (3) the passage of a predetermined period of time since the user was engaged in a chat; (4) a combination of those conditions, or (5) some other condition or conditions that indicate that a user is significantly more-difficult-to-match than the average. By automatically unblurring the profile photographs of such more-difficult-to-match users, the system of the present invention not only improves the more-difficult-to-match user's chances of achieving a match in a shorter period of time (i.e., by displaying the user's profile photograph unblurred), even though that more-difficult-to-match user did not elect the "unblurred" level of functionality, it also speeds up and otherwise improves the operation of the computerized matching system as a whole for all users. This reduces the number of views of profile photographs by all users, reduces the required number of "clicks" by each user, reduces processing by the server, and reduces power use and extends battery life for battery-powered devices such as cell phones and tablets that are running the app.

In some aspects, the techniques described herein also relate to an online matching computer system and application performing the steps of: presenting a first plurality of user profiles to a first interface running on a first user electronic device having a launched application; presenting a second plurality of user profiles to a second user electronic device having a launched application, wherein the first plurality of user profiles includes a second user profile of the second user, wherein a portion of the second user profile is blurred, wherein the second plurality of user profiles includes a first user profile of the first user, wherein a portion of the first user profile is blurred; receiving a negative preference regarding the second user profile of the second user from the first interface; determining that a negative preference regarding the first user profile of the first user has not been received from the second interface; based on the determining, instructing the first interface to display an in-app notification on the first user device, wherein the in-app notification indicates a first option for the first user to review the second user profile; receiving an acceptance of the first option from the first interface; instructing the first interface to display a throwback page on the first user device, wherein the throwback page includes a third plurality of user profiles that include the second user profile still having at least a portion of the second user profile blurred; and receiving a positive preference regarding the second user profile from the first interface.

In some aspects, the techniques described herein relate to an online matching computer system and application communicatively coupled to a first interface running on a first user device of a first user and a second interface running on a second user device of a second user, the online matching computer having one or more processors configured to: present a first plurality of user profiles to the first interface, wherein the first plurality of user profiles includes a second user profile of the second user, wherein a portion of the second user profile is blurred; present a second plurality of user profiles to the second interface, wherein the second plurality of user profiles includes a first user profile of the first user, wherein a portion of the first user profile is blurred; receive a negative preference regarding the second user profile of the second user from the first interface; determine that a negative preference regarding the first user profile of the first user has not been received from the second interface; based on the determining, instruct the first interface to display an in-app notification on the first user device, wherein the in-app notification indicates a first option for the first user to review the second user profile; receive an acceptance of the first option from the first interface; instruct the first interface to display a throwback page on the first user device, wherein the throwback page includes a third plurality of user profiles that include the second user profile still having at least a portion of the second user profile blurred; and receive a positive preference regarding the second user profile from the first interface.

In aspects, the profile of a user can include a portion, often referred to herein as a "private card," that the user desires to not be publicly accessible by other users unless and until the user whose profile it is grants specific approval to a particular other user. A user can create a private card by uploading one or more photos and/or other information to the application and switching on the "blurring private cards" for those photos and/or other information in order to make them indiscernibly blurred or otherwise inaccessible to view for the other users, until an approval for rendering them accessible to a particular other user is received from the user who created and blurred the private card.

In at least some aspects, receiving a positive preference does not automatically unblur private portions of the user profile, such as private cards. Instead, there needs to be a specific request to do so from another user, which may or may not be sent together with a positive preference, and a specific approval of the request by the owner of the private cards. A positive preference also does not result in unblurring of a user's profile photograph, which is partially blurred as a result of the basic level of functionality elected by the user.

In some aspects, the techniques described herein relate to an online matching computer application and system including performing the steps of: presenting a first plurality of user profiles to a first interface running on a first user device of a first user; presenting a second plurality of user profiles to a second user device of a second user, wherein the first plurality of user profiles includes a second user profile of the second user, wherein a portion of the second user profile is blurred, wherein the second plurality of user profiles includes a first user profile of the first user, wherein a portion of the first user profile is blurred; and upon occurrence of a condition, i) unblurring the portion of the second user profile on the first interface, ii) unblurring the portion of the first user profile on the second interface, or iii) unblurring the portion of the second user profile on the first interface and unblurring the portion of the first user profile on the second interface.

The foregoing features enable users to find matches and start conversations much easier and faster without spending a lot of time in the finder page of the application (where users search for other users and wait for other users to find them), thus minimizing use of limited computing resources and the limited display space, problems that are particularly acute for computers having limited computing power and screen space, such as cell phones and tablets.

Other technical features may be readily apparent to one skilled in the art from the following figures, description and claims.

BRIEF DESCRIPTION OF THE DRAWINGS

For a more complete understanding of this disclosure, reference is now made to the following description, taken in conjunction with the accompanying drawings, in which:

FIGS. 5A, 5B, and 5C collectively illustrate a schematic diagram of an embodiment of communications among the components of the online matching system.

DETAILED DESCRIPTION

"Interface" as used herein means an application or browser running on a user computer device that is configured to receive inputs from a human via the user device running the interface, and to interact and communicate with the online matching computer according to the functionality described herein.

The methods and systems disclosed herein concern online matching between user pairs, e.g., user-1 and user-2, where the initiating condition for all subsequent steps and functions is a negative preference for one of the users to the other (e.g., user-1 indicates a negative preference for user-2). The methods and systems disclosed herein allow user-1 to review user profiles where user-1 previously indicated a negative preference, in both a scenario where user-2 indicates a positive preference for user-1 (e.g., see FIG. 3) and a scenario where user-2 does not indicate any preference for user-1 (e.g., see FIG. 4). The methods and systems disclosed herein also allow for private portion(s) of a user profile (such as their private card) to be selectively rendered inaccessible or accessible to other users, to enhance the ability to disclose more information about themselves from their private portion(s) of their user profile (such as their private cards) for viewing by selected other users, while maintaining privacy of those portion(s) until conditions disclosed herein are met by which the inaccessible private portions can be rendered accessible to another user. As such, these features provide for a specific manner of selectively displaying a limited set of information to different other users, when the device is in a particular state, which is preferably the "find" state or mode. Moreover, as understood by the inventors, there can be a need to induce users to express positive preferences to each other leading to further communication by way of selectively showing private cards or other private portions of their profiles to only a particular other user or users.

Figure 1:
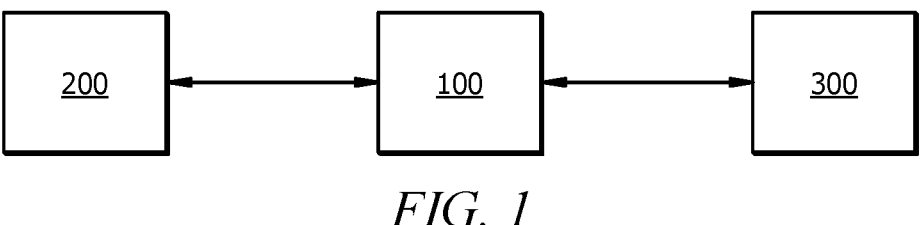
FIG. 1 illustrates a schematic diagram of an online matching system disclosed herein.

FIG. 1 illustrates a schematic diagram of an online matching system disclosed herein. The online matching system includes an online matching computer 100, a first user device 200, and a second user device 300. The system can include any number of user devices operatively coupled to the online matching computer 100, with the first user device 200 and the second user device 300 being exemplary of a pair of user devices that interact with the online matching computer 100 in accordance with the disclosure.

The online matching computer 100 can include one or more processors, memory, networking cards or interfaces, and other equipment for performing the method and functionality disclosed herein. In embodiments, the online matching computer 100 can include multiple computers, located in a brick-and-mortar location, local to the administrator of the online matching computer 100, in the cloud, or a combination thereof.

In embodiments, the online matching computer 100 can include a distributed computer architecture, such that hardware is geographically distributed to connect first user device 200 with the hardware that is geographically closest to the first user device 200 and to connect the second user device 300 with the hardware that is geographically closest to the second user device 300. An advantage of distributed architecture is scalability for mass diagnostic testing for myriad user computer devices.

In some aspects, the online matching computer 100 can include computers embodied as servers that are scalable in the cloud, such as those available from Amazon Web Services. The online matching computer 100 can additionally include one or more databases, or clusters of databases, configured to store user information (e.g., profile information, video files, image file(s), or combinations thereof) received by the online matching computer 100 from the user devices 200 and 300 (and myriad other user devices), where the databases are accessible by the online matching computer 100 for storage and retrieve of the user information.

The first user device 200 and the second user device 300 each may be representative of a personal computer, an electronic notebook, a cellular telephone, an electronic tablet device, a laptop, a personal digital assistant (PDA), a smart device, a smart phone, or any other suitable device (wireless or otherwise: some of which can perform web browsing), component, or element capable of accessing one or more elements within the online matching computer system. Each of the first user device 200 and the second user device 300 has any suitable interface for a user such as a video camera, a microphone, a keyboard, a set of buttons, a mouse, a touch-sensitive display, a touch-sensitive area, or any other appropriate equipment according to particular configurations and arrangements. In addition, interface may be an element or set of elements designed specifically for communications with the online matching computer 100. In aspects, the elements may be fabricated or produced specifically for matching applications or websites run on or accessed via the first user device 200 and the second user device 300.

Regarding network communication technology, the online matching computer 100 can be networked with each of the first user device 200 and with the second user device 300 via any wired internet connection, wireless internet connection, local area network (LAN), wired intranet connection, wireless intranet connection, or combinations thereof. The networks used for communication between the online matching computer 100 and the first user device 200 can include a Global System for Mobile Communications (GSM), Code-division multiple access (CDMA), General Packet Radio Service (GPRS), Evolution-Data Optimized (EV-DO), Enhanced Data Rates for GSM Evolution (EDGE), Universal Mobile Telecommunications System (UMTS), etc. The networks used for communication between the online matching computer 100 and the second user device 300 can include a Global System for Mobile Communications (GSM), Code-division multiple access (CDMA), General Packet Radio Service (GPRS), Evolution-Data Optimized (EV-DO), Enhanced Data Rates for GSM Evolution (EDGE), Universal Mobile Telecommunications System (UMTS), etc. However, it has particular application for electronic devices having limited computing power and small screens like cellular telephones where data capacity and screen space for both display of information, pictures and activation buttons is limited.

Figure 2:
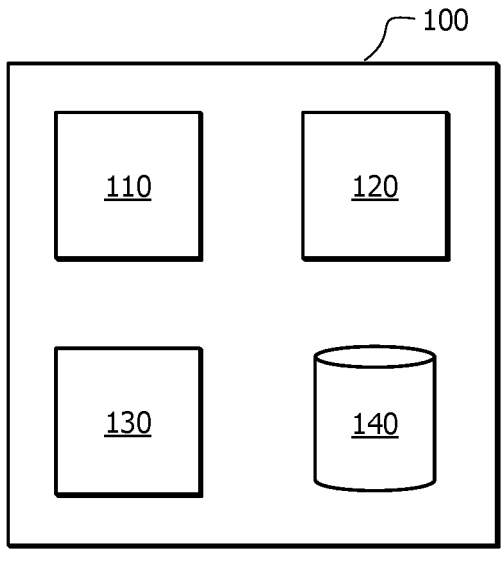
FIG. 2 illustrates a schematic diagram of an online matching computer.

FIG. 2 illustrates a schematic diagram of an online matching computer 100. The online matching computer 100 can include a matching module 110, a throwback module 120, a chat module 130, and a datastore 140. The modules 110, 120, and 130 generally acts to describe functions of the online matching computer 100; however, the modules 110, 120, and 130 can practically be embodied as an integrated program or have overlapping functionality with one another. The matching module 110 can be configured to perform functionality for any suitable matching techniques for matching any number of pairs of users with one another (or not matching based on any criteria or conditions). Within the scope of this disclosure, for example, the matching module 110 can administer to preferences (e.g., positive or negative preferences) with respective to one another. The throwback module 120 can be configured to perform functionality related to allowing a user to change their preference with respect to another user. Particularly, the throwback module 120 allows a user to change a negative preference to a positive preference for another user. The chat module 130 can be configured to perform functionality that initiates and administers chat messaging or video streaming between two users that agree to such messaging and/or streaming according to the disclosure. The datastore 140 is configured to store any combination of information disclosure herein received by the online matching computer 100 from any number of user devices, for any time period set by an administrator of the online matching computer 100. The datastore 140 can include any number of datastores at any number of locations.

Figure 3:
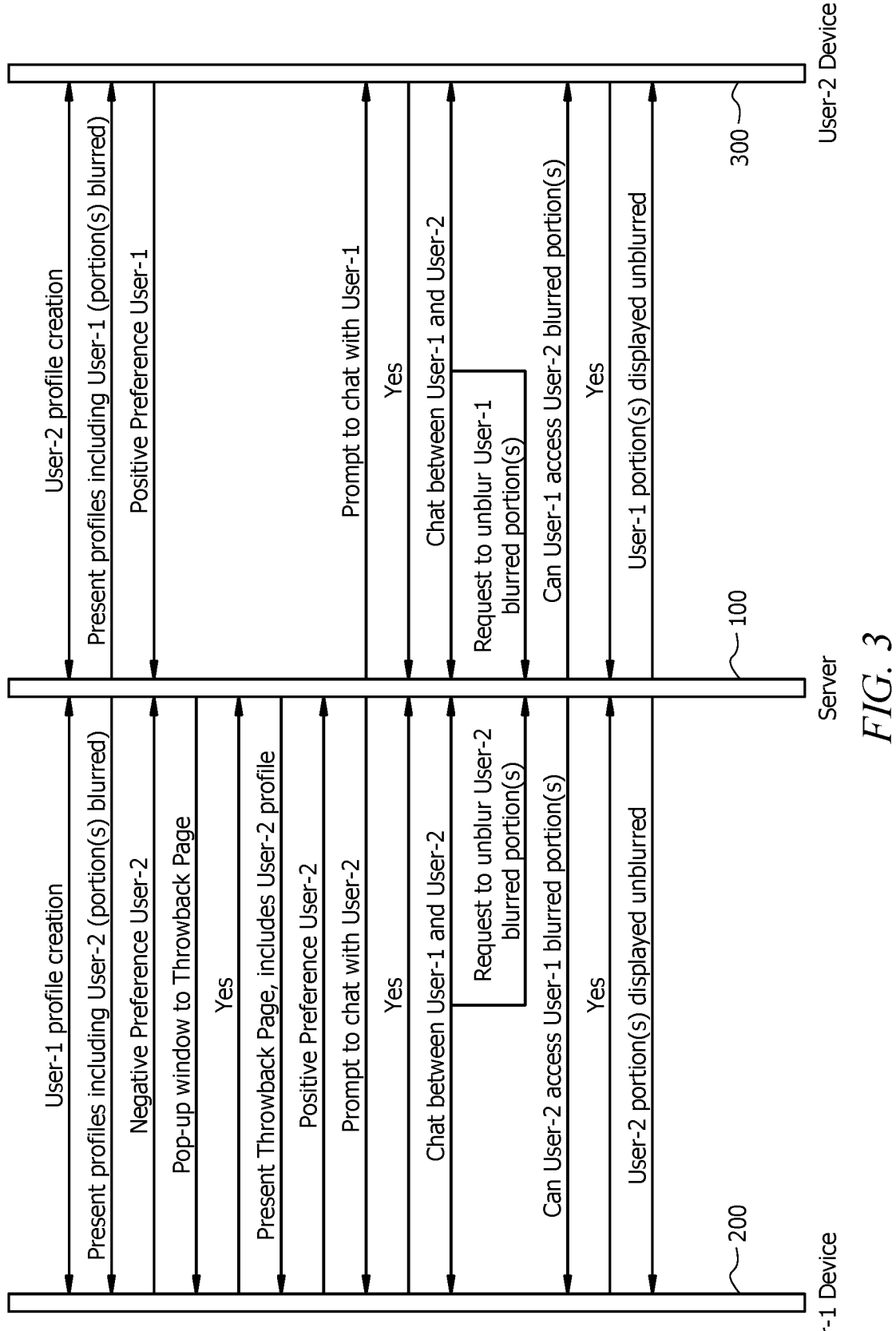
FIG. 3 illustrates a schematic diagram of an embodiment of communications among the components of the online matching system.

FIG. 3 illustrates a schematic diagram of an embodiment of communications among the components of the online matching system. The flow of communications is from top to bottom in FIG. 3.

The communications start with user-1 profile creation and user-2 profile creation. These creations can occur at different points in time. User-1 interacts with the server 100 via the user-1 device 100 to create the user-1 profile. User-2 interacts with the server 100 via the user-2 device 300 to create the user-2 profile. The profile of any user that is stored and maintained by the server 100 can include data such as numeric data, voice data, graphic, video files, text files, script data, or combinations thereof, or any other suitable information in any appropriate format that may be stored and maintained as a user profile by the server 100 data and associated with a user or items in order to make matching decisions or selections.

In aspects, the server 100 can present user profiles that include any combination of data disclosed herein to the user-1 device 200, where the data presented to the user-1 device 200 includes the user-2 profile. In aspects, at least a portion of the user-2 profile is blurred such that the portion is displayed on the user-1 device 200 but blurred so as to not be readily observed by others as to content of the portion (e.g., certain photos, name, etc., blurred). The blurred portion can be a private card of user-1.

To obtain such approval, user-2 can send a request for an access to view the private cards of user-1 a) when user-1 has already made the positive preference for user-2, and user-2 is making a positive preference for user-1, which can facilitating a match between user-1 and user-2; or b) can request such approval after the match between user-2 and user-1 has occurred.

In aspects, the private card(s) of the user-2 profile are blurred or otherwise rendered undiscernible or inaccessible to other users, while, in general, all other data in the user-2 profile is not blurred or otherwise rendered undiscernible or inaccessible. Alternatively, other portion(s) of the user-2's profile can also be blurred or otherwise rendered undiscernible or inaccessible by user-2.

For clarity, the degree of blurring of private cards by a user (such as user-2 in the foregoing example) can be sufficient to render the user's private cards completely undiscernible to an average viewer, unlike the degree of partial blurring of the profile photograph of a user electing a basic level of functionality, since this profile photograph of the user, even with a basic level of functionality, is always intended for display to other users in some discernible manner, without privacy restrictions, even when partially blurred.

The server 100 can present the interface to the user-1 device 200 for allowing user-1 to indicate a preference about user-2 based on the displayed profile (with or without blurred portion(s)). User-1 can view the profiles on the user-1 device 200 via the interface, and in the flow of communications in FIG. 3, user-1 indicates a negative preference for user-2 (e.g., press an "x" button, press a dislike button, or combinations thereof). The server 100 can present user profiles that include any combination of data disclosed herein to the user-2 device 300, where the data presented to the user-2 device 300 includes the user-1 profile. In aspects, at least a portion of the user-1 profile is blurred such that the portion is displayed on the user-2 device 300 but blurred so as to not be readily observed as to content of the portion (e.g., certain photos, name, etc.). The blurred portion can be referred to as a private card of the user-1.

Generally, a private card can be used by a user to selectively limit the information that can be disclosed on the online matching services and systems because it can improve the quality of connection with another user to initially selectively keep some information private and then to selectively allow disclosure of some of such private card information to a particular other user at a time deemed appropriate by the owner of the private card. Generally, information on private cards can be selectively blurred or otherwise of degraded in visibility to keep the information private, or to selectively grant additional access to otherwise private information such as private photos for better inter- action between users by unblurring or otherwise rendering the information viewable. This makes the private informa- tion effectively inaccessible for viewing by the other users, including the user-2, until user-1 grants permission for access to such private information and photos, which usually occurs after a match occurs between user-1 and user-2.

As an example, when the app is in the launched state and/or in the "find" mode, user-2 can send a request for an access to view the private cards of user-1 a) when user-1 has already made the positive preference for user-2, and user-2 is making a positive preference for user-1; b) after the match between user-2 and user-1. A blurring or unblurring of the private card, which contains additional private information of the potential match, such as additional personal discus- sion or additional photographs, can occur at either device 200, device 300, or both, in furtherance of the employment of the private card.

In aspects, the private card(s) of the user-1 profile are blurred while all other data in the user-1 profile is not blurred; alternatively, other portion(s) of the profile can be blurred.

The server 100 can present the interface to the user-2 device 300 for allowing user-2 to indicate a preference about user-1 based on the displayed profile (with blurred portion(s)). User-2 can view the profiles on the user-2 device 300 via the interface, and in the flow of communications in FIG. 3, user-2 indicates a positive preference for user-1, usually with a single control action, such as by pressing a check button, pressing a like button, pressing a "Rainbow Like" button, or combinations thereof. A "Rainbow Like" functions as a combination button that, when pressed, both sends a "Like" and requests a chat.

Thus, FIG. 3 depicts a flow of communications where user-1 indicates a negative preference for user-2 and user-2 indicates a positive preference for user-1.

In FIG. 3, after the server 100 receives a negative pref- erence for user-2 from user-1 device 200 (and optionally after the server 100 receives a positive preference for user-1 from the user-2 device 300), the server 100 is configured to present an in-app notification for an option for user-1 (because of the negative preference of user-2) to enter a throwback page containing profiles of other users for which user-1 previously indicated a negative preference (the pro- files including the user-2 profile). In aspects, it is preferred that the in-app notification is presented for a limited time period such as 30 seconds, 1 minute, 1.5 minutes, or more. By limiting the time period, system resources otherwise consumed when the user is in the "find" mode are conserved, while a time limit also improves the likelihood of a match, because a time limit tends to create a psychological "sense of urgency" on the part of the user. In other aspects, the in-app notification stays on the interface until a selection of yes or no via a button or other such indication is made by user-1 via the user-1 device 200. For a selection by user-1 of no throwback, nothing further happens with regard to the throwback page, and the throwback page is not presented to the user-1 device 200 at that time. For a selection by user-1 of yes throwback, an indication of which is received by the server 100 from the user-1 device 200, the server 100 then is configured to present to the user-1 device 200 the throw- back page via the interface of the user-1 device 200. In aspects, the throwback page includes profiles of other users for which user-1 previously indicated a negative preference, including the user-2 profile. In aspects, portion(s) of the user-2 profile that were previously blurred remain blurred in the throwback page.

Via the interface of the user-1 device 200, user-1 can then indicate a positive preference or a negative preference for user-2 via the throwback page.

In aspects where a negative preference is received by server 100 from the user-1 device 200, the server 100 can take no action with regard to any communications between user-2 and user-1.

In aspects, where a positive preference (e.g., press a check button, press a like button, press a "Rainbow Like" button, or combinations thereof) is received by the server 100 from the user-1 200 device, the server 100 can prompt via the interfaces of the user-1 device 200 and the user-2 device 300 for user-1 and user-2 to chat with one another. Chat between user-1 device 200 and user-2 device can be opened by the server 100 upon receiving mutual positive preferences from user-1 and user-2. Chat can occur in messaging windows displayed on the interfaces of the user-1 device 200 and user-2 device 300.

During the chat, a request to unblur the user-2 blurred portions of the user-2 profile, such as those on user-2's private card, can be received by the server 100 from the user-1 device 200. Additionally or alternatively, a request to unblur the user-1 blurred portions of the user-1 profile can be received by the server 100 from the user-2 device 300.

After receiving a request to unblur user-2 blurred portion(s) of the user-2 private card information, the server 100 can send a request via the interface of the user-2 device 300 asking can user-1 access the user-2 blurred portion(s) (e.g., private cards) of the user-2 profile.

For clarity, a private card is a separate page or portion of a user's profile, which can be selectively blurred so as to be rendered undiscernible, or otherwise rendered effectively inaccessible to all other users other than those specifically approved by the owner of the private card to have unblurred or otherwise unrestricted access to the user's private card or cards. Only the information on private cards (not public portions of a user's profile) can be selectively indiscernibly blurred, or selectively unblurred or otherwise rendered accessible by a user. For a user whose profile photograph, which is intended to be public, is displayed partially blurred to other users because of the user's choice of a basic level of functionality, the user can only selectively have the partial blurring removed by choosing a higher level of functionality that permits this. Otherwise, the user's profile photograph will remain partially blurred, unless and until the matching computer determines that a predetermined condition for the system to automatically remove the blurring has been met, such as when a certain period of time has passed without that user having received positive preference such as a "like." However, whether or not this predetermined condition is met is determined automatically by the matching computer, not by the user, as distinguished from the blurring or unblurring that users can select for their private cards.

If user-2 selects no and the server 100 receives a no message from the user-2 device 300, then no further action is taken, and the user-2 blurred portion(s) remain blurred when the user-2 private card information is displayed on the user-1 device 200. If user-2 selects yes and the server 100 receives a yes message from the user-2 device 300, then the server 100 is configured to unblur the blurred portion(s) (e.g., private cards) of the user-2 profile, and the server 100 can then present user-2 portion(s) (e.g., private card(s)) of the user-2 profile unblurred to the interface of the user-1 device 200. As such, the selected blurring and unblurring of private cards allows additional selective access to information such as private photos for better interaction between those users, but under sole control of the user whose private card it is.

After receiving a request to unblur user-1 blurred portion(s) of the user-1 profile, the server 100 can send a request via the interface of the user-1 device 200 asking can user-2 access the user-1 blurred portion(s) (e.g., private cards) of the user-1 profile. If user-1 selects no and the server 100 receives a no message from the user-1 device 200, then no further action is taken, and the user-1 blurred portion(s) remain blurred when the user-1 profile is displayed on the user-2 device 300. If user-1 selects yes and the server 100 receives a yes message from the user-1 device 200, then the server 100 is configured to unblur the blurred portion(s) (e.g., private cards) of the user-1 profile, and the server 100 can then present user-1 portion(s) (e.g., private card(s)) of the user-1 profile unblurred to the interface of the user-2 device 300.

Figure 4:
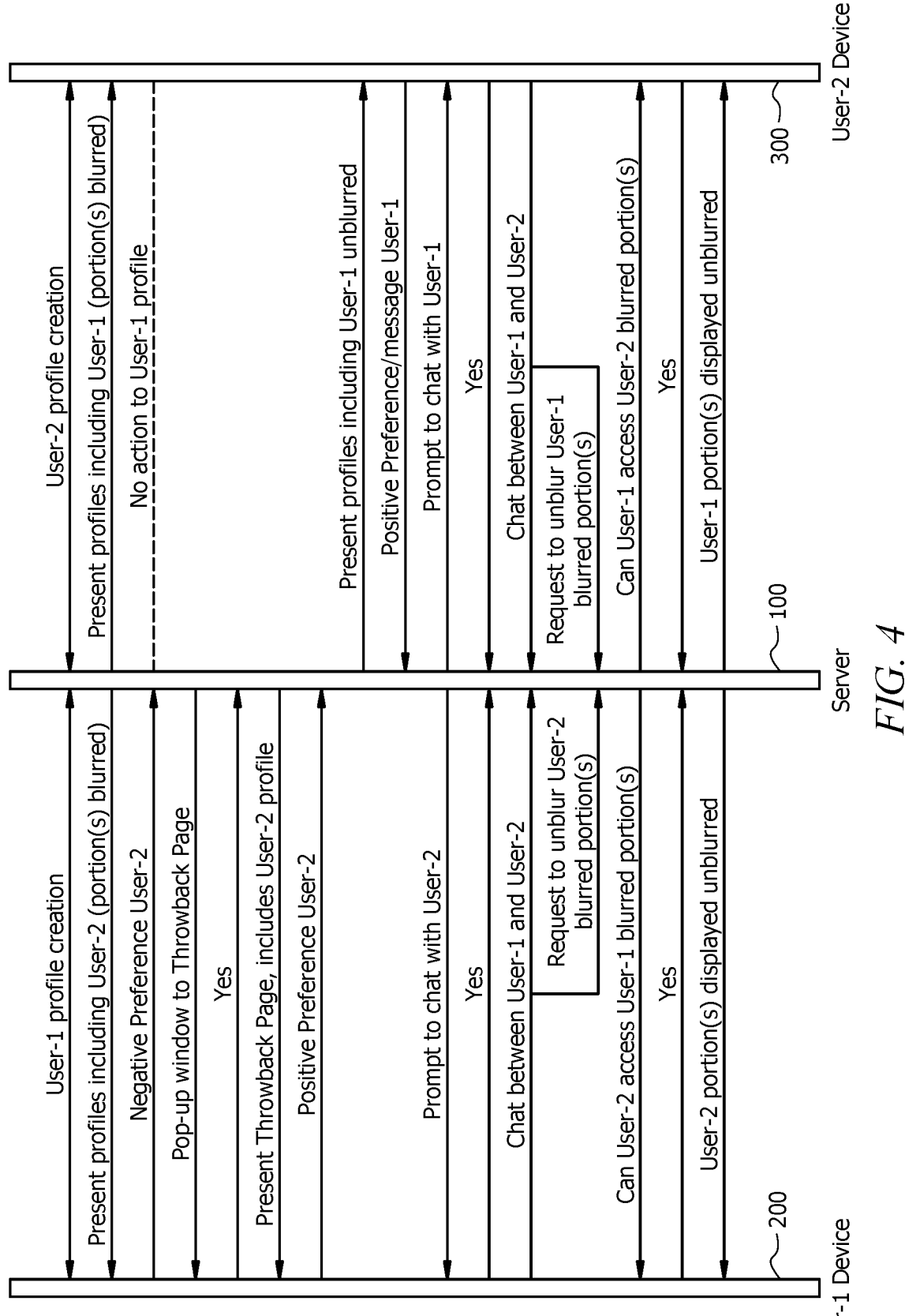
FIG. 4 illustrates a schematic diagram of an alternative embodiment of communications among the components of the online matching system.

FIG. 4 illustrates a schematic diagram of an alternative embodiment of communications among the components of the online matching system. The flow of communications is from top to bottom in FIG. 4.

The communications start with user-1 profile creation and user-2 profile creation. These creations can occur at different points in time. User-1 interacts with the server 100 via the user-1 device 100 to create the user-1 profile. User-2 interacts with the server 100 via the user-2 device 300 to create the user-2 profile. The profile of any user that is stored and maintained by the server 100 can include data such as numeric data, voice data, graphic, video files, text files, script data, or combinations thereof, or any other suitable information in any appropriate format that may be stored and maintained as a user profile by the server 100 data and associated with a user or items in order to make matching decisions or selections.

The server 100 can present user profiles that include any combination of data disclosed therein to the user-1 device 200, where the data presented to the user-1 device 200 includes the user-2 profile. In aspects, at least a portion of the user-2 profile is blurred such that, when displayed on the user-1 device 200, the blurring is sufficient to make the information undiscernible and not readily observable as to content of the portion (e.g., photos, name, etc., which are blurred). The blurred portion can be a private card of user-1. In aspects, the private card(s) of the user-2 profile are blurred while all other data in the user-2 profile is not blurred; alternatively, other portion(s) of the profile can also be blurred. Private cards in FIG. 4 can be the same as described for the private cards in FIG. 3.

The server 100 can present the interface to the user-1 device 200 for allowing user-1 to indicate a preference about user-2 based on the displayed profile (with blurred portion(s)). User-1 can view the profiles on the user-1 device

200 via the interface, and in the flow of communications in FIG. 4, user-1 can indicate a negative preference for user-2 (e.g., press an "x" button, press a dislike button, or combinations thereof).

The server 100 can present user profiles that include any combination of data disclosed herein to the user-2 device 300, where the data presented to the user-2 device 300 includes the user-1 profile. In aspects, at least a portion of the user-1 profile is blurred such that the portion is displayed on the user-2 device 300 but blurred such that, when displayed on the user-2 device 300, the blurring is sufficient to make the information undiscernible and not readily observable as to content of the portion (e.g., photos, name, etc., which are blurred). The blurred portion can be a private card of the user-1. In aspects, a private card of user-1 can include any sort of information or photographs considered private by user-1. In aspects, the private card(s) of the user-1 profile are blurred while all other data in the user-1 profile is not blurred; alternatively, other portion(s) of the profile can be blurred as well.

The server 100 can present the interface to the user-2 device 300 for allowing user-2 to indicate a preference about user-1 based on the displayed profile (with blurred portion(s)). In aspects, the interface can preferably be presented for a limited period of time such as 5, 10, or 15 seconds. Alternately, the interface can be presented for an unlimited time, but this will use a greater amount of limited display space and a greater amount of system resources. User-2 can view the profiles on the user-2 device 300 via the interface, and in the flow of communications in FIG. 4, user-2 does not indicate a preference for user-1 (e.g., the dashed line indicates user-2 has not made any indication of preference positive or negative of user-1).

Thus, FIG. 4 depicts a flow of communications where user-1 indicates a negative preference for user-2 and user-2 does not indicate a preference for user-1.

In FIG. 4, after the server 100 receives a negative preference for user-2 from user-1 device 200, and in the case where no preference is received for user-1 from the user-2 device 300, the server 100 is configured to present an in-app notification for an option for user-1 (because of the negative preference of user-2) to enter a throwback page containing profiles of other users for which user-1 previously has indicated a negative preference (the profiles including the user-2 profile).

In aspects, the in-app notification is presented for a limited time period such as 30 seconds, 1 minute, 1.5 minutes, or more. In other aspects, the in-app notification stays on the interface until a selection of yes or no via a button or swipe is made by user-1 via the user-1 device 200, or the limited time period expires. For a selection by user-1 of no throwback, nothing further happens with regard to the throwback page, and the throwback page is not presented to the user-1 device 200 at that time. For a selection by user-1 of yes throwback, an indication of which is received by the server 100 from the user-1 device 200, the server 100 then is configured to present to the user-1 device 200 the throwback page via the interface of the user-1 device 200. In aspects, the throwback page includes profiles of other users for which user-1 previously indicated a negative preference, including the user-2 profile. In aspects, portion(s) of the user-2 profile that were previously blurred remain blurred in the throwback page.

Via the interface of the user-1 device 200, user-1 can then indicate a positive preference or a negative preference for user-2 via the throwback page.

In aspects where a negative preference is received by server 100 from the user-1 device 200, the server 100 can take no action with regard to any communications between user-2 and user-1.

In aspects, where a positive preference (e.g. press a check button, press a like button, press a "Rainbow Like" or other button or message that has the effect of a "LIKE," depending upon the subscription plan button, or combinations thereof, is received by the server 100 from the user-1 200 device, the server 100 can present otherwise private information from the private cards to the user-2 device 300, after user-1 grants approval. In these aspects, user-2 can indicate via an interface of the user-2 device 300 a positive preference for user-1 and the user-2 device 300 can send the positive preference to the server 100.

In another aspect, when user-1's profile (except for the private cards) is shown unblurred to the second user among blurred profiles of other users, the chances that user-2 will indicate a positive preference for user-1 increases.

In response to receiving the positive preference for user-1 from the user-2 device 300, the server 100 can prompt via the interfaces of the user-1 device 200 and the user-2 device 300 for user-1 and user-2 to chat with one another. Chat between user-1 device 200 and user-2 device can be initiated by the server 100 upon receiving by the server 100 a yes indication (e.g., selection of yes button displayed on screen of the user-1 device 200 and on the user-2 device 300) from the user-1 device 200 and the user-2 device 300. Chat can occur in messaging windows displayed on the interfaces of the user-1 device 200 and user-2 device 300.

During the chat, a request to unblur the user-2 blurred portions of the user-2 profile can be received by the server 100 from the user-1 device 200. Additionally or alternatively, a request to unblur the user-1 blurred portions of the user-1 profile can be received by the server 100 from the user-2 device 300.

After receiving a request to unblur user-2 blurred portion(s) of the user-2 profile, the server 100 can send a request via the interface of the user-2 device 300 asking can user-1 obtain access to the user-2 blurred portion(s) (e.g., private cards) of the user-2 profile. If user-2 selects no and the server 100 receives a no message from the user-2 device 300, then no further action is taken, and the user-2 blurred portion(s) remain blurred when the user-2 profile is displayed on the user-1 device 200. If user-2 selects yes and the server 100 receives a yes message from the user-2 device 300, then the server 100 is configured to unblur the blurred portion(s) (e.g., private cards) of the user-2 profile, and the server 100 can then present user-2 portion(s) (e.g., private card(s)) of the user-2 profile unblurred to the interface of the user-1 device 200.

After receiving a request to unblur user-1 blurred portion(s) of the user-1 profile, the server 100 can send a request via the interface of the user-1 device 200 asking can user-2 access the user-1 blurred portion(s) (e.g., private cards) of the user-1 profile. If user-1 selects no and the server 100 receives a no message from the user-1 device 200, then no further action is taken, and the user-1 blurred portion(s) remain blurred when the user-1 profile is displayed on the user-2 device 300. If user-1 selects yes and the server 100 receives a yes message from the user-1 device 200, then the server 100 is configured to unblur the blurred portion(s) (e.g., private cards) of the user-1 profile, and the server 100 can then present user-1 portion(s) (e.g., private card(s)) of the user-1 profile unblurred to the interface of the user-2 device 300.

Figure 5A:
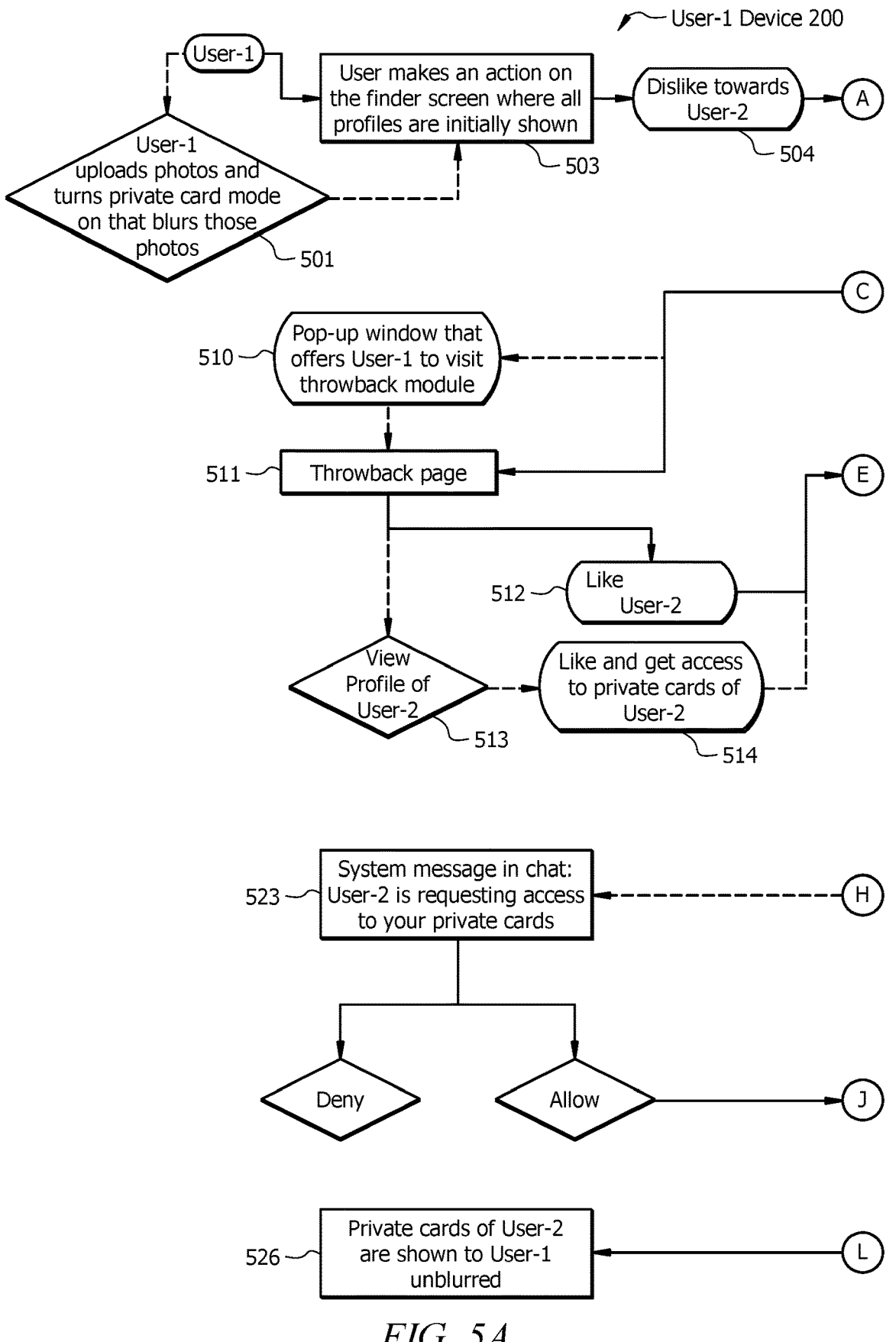
Figure 5C:
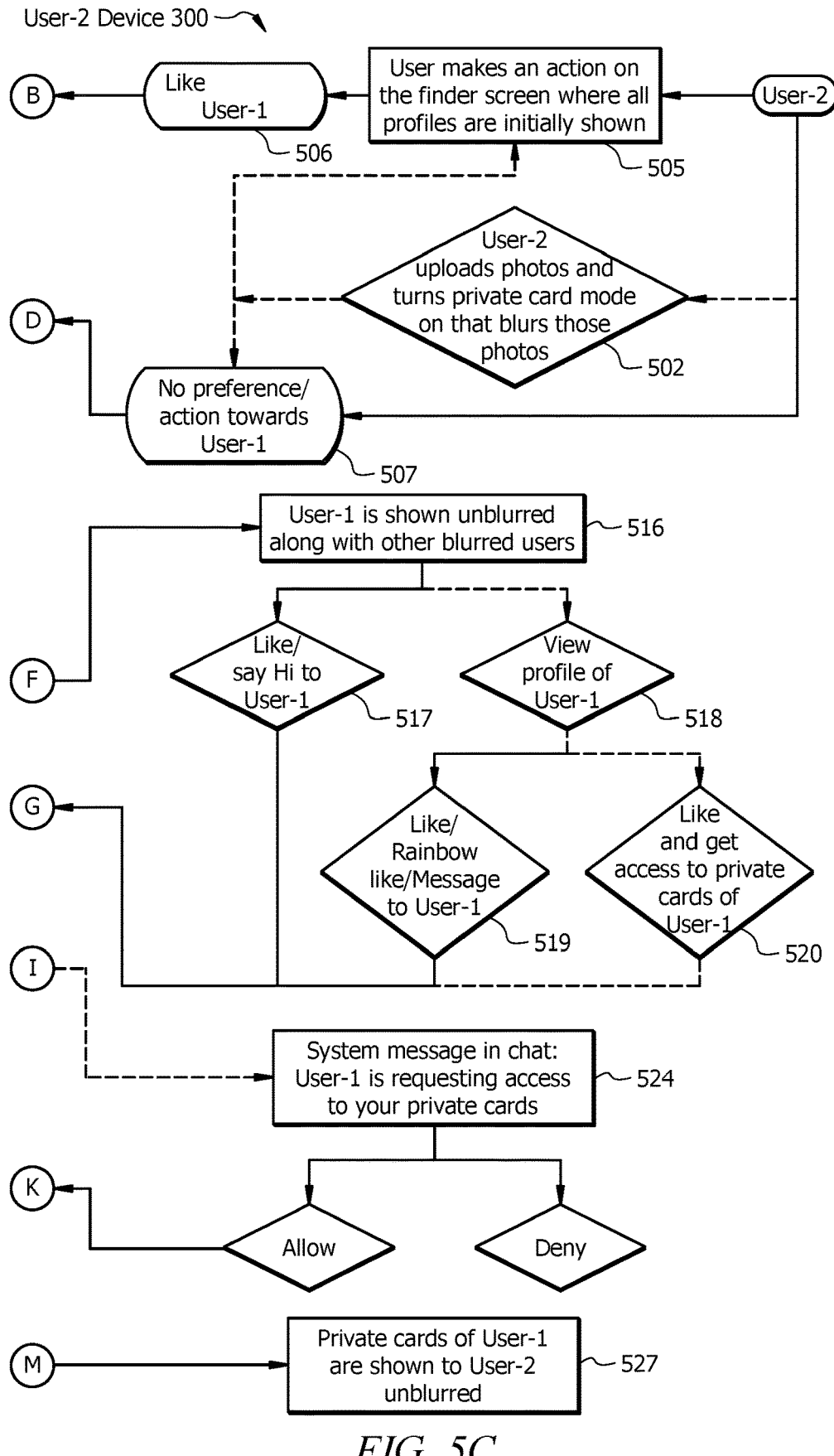

FIGS. 5A, 5B, and 5C collectively illustrate a schematic diagram of an embodiment of communications among the components of the online matching system. Profile creation for user-1 and user-2 occurs in steps 501 (FIG. 5A) and 502 (FIG. 5C). Step 503 (FIG. 5A) indicates when the server 100 presents profiles to the user-1 device 200, where the profiles include user-2 profile with blurred portion(s). Step 504 (FIG. 5A) is when the user-1 dislikes (the negative preference) user-2's profile. Step 505 (FIG. 5C) indicates when the server 100 presents profiles to the user-2 device 300, where the profiles include user-1 profile with blurred portion(s). Step 506 (FIG. 5C) is when the user-2 likes (the positive preference) user-1's profile; alternatively, step 507 is when the user-2 does not take any action with respect to user-1's profile.

At step 507 (FIG. 5C), there was no preference/action taken towards user-1.

Step 509 is when the server 100 stores the inputs received from the user-1 device 200 and the user-2 device 300 (e.g., dislike from user-1 and like or no action from user-2). Step 510 is when the server 100 presents the in-app notification to the interface of the user-1 device 200. Step 511 is the throwback page having user-2 profile displayed with blurred portion(s). Step 513 indicates that the user-1 viewed the user-2 profile, and step 514 indicates that user-1 like (positive preference) the user-2 profile and optionally requests access to the private card(s) (blurred portion(s)) of the user-2 profile. Step 512 is alternative to steps 513 and 514, and in step 512 the user-1 indicates a like or "Rainbow Like" of user-2. In aspects, a "Rainbow Like" is different from a like because Rainbow Like indicates a positive preference by one user to another user and at the same time serves as a request to initiate a chat.

At step 515 (FIG. 5B), the server 100 performs back end processing and then front-end processing. For example, back end processing can include analysis of whether user 1 had indicated either Like/Rainbow Like or Like and requested to get access to private cards of User-2 and whether previously User-2 had expressed positive preference or no preference to user-1. Depending on the outcome of such analysis, the front end would create a screen to be displayed on the User-2 device in Step 516 or 522.

After front-end processing, in step 516 (FIG. 5C) the server 100 can optionally display portion(s) of user-1 profile as unblurred on the user-2 device 300, along with other blurred users. Step 517 (FIG. 5C) is when the user-2 likes or says "hi" to user-1. Step 518 is when user-2 views the user-1 profile and then either: i) in step 519 (FIG. 5C) likes or Rainbow Likes (positive preference) or messages user-1, or ii) in step 520 likes and requests access to the private cards of user-1. For clarity, when user-2 gives a "like" to user-1, it acts as a request for access to user-1's private card, but no access is provided unless user-1 affirmatively grants such access.

At step 521, the server 100 performs back end processing and then front-end processing. For example, the back end processing can including receiving actions from user-2 and/or user-1, and performing necessary processing based on those actions. For example, front end processing can include tasks such as delivering messages, photographs, notifications etc. to the users, including those sent by another user, and notifications generated by the back end processing and sent to the front end processor to deliver to one or more users.

In step 522, the server 100 allows user-1 and user-2 to chat with one another. Steps 523 and 524 can be performed alternatively or in combination. In step 523, user-2 requests access to user-1's private cards. User-1 then denies or allows the access. In step 524, user-1 requests to access user-2 private cards. User-1 then denies or allows the access.

At step 525, the server 100 performs back end processing and then front-end processing, generally as described above.

After step 525, and at step 526 the server 100 presents private cards of user-2 to user-1, unblurred. After step 525, and at step 527 the server 100 presents private cards of user-1 to user-2, unblurred.

ADDITIONAL DESCRIPTION

Aspect 1. An online matching method comprising: presenting a first plurality of user profiles to a first interface running on a first user device of a first user; presenting a second plurality of user profiles to a second user device of a second user, wherein the first plurality of user profiles includes a second user profile of the second user, wherein a portion of the second user profile is blurred, wherein the second plurality of user profiles includes a first user profile of the first user, wherein a portion of the first user profile is blurred; receiving a negative preference regarding the second user profile of the second user from the first interface; determining that a negative preference regarding the first user profile of the first user has not been received from the second interface; based on the determining, instructing the first interface to display an in-app notification on the first user device, wherein the in-app notification indicates a first option for the first user to review the second user profile; receiving an acceptance of the first option from the first interface; instructing the first interface to display a throwback page on the first user device, wherein the throwback page includes a third plurality of user profiles that include the second user profile still having at least a portion of the second user profile blurred; and receiving a positive preference regarding the second user profile from the first interface.

Aspect 2. The online matching method of Aspect 1, further comprising: prompting the first interface and the second interface with a second option to initiate a chat between the first user and the second user; receiving an acceptance of the second option from the first interface and from the second interface; and initiating the chat between the first user and the second user via the first interface and the second interface.

Aspect 3. The online matching method of Aspect 1 or 2, further comprising: administering the chat; during the chat, receiving a first request from the first interface to view the portion of the second user profile that is blurred; prompting the second interface for permission to allow the portion of the second user profile that is blurred to be viewed on the first interface as unblurred; receiving a first approval from the second interface to allow the portion of the second user profile that is blurred to be viewed on the first interface as unblurred; and instructing the first interface to unblur the portion of the second user profile.

Aspect 4. The online matching method of any one of Aspects 1 to 3, further comprising: during the chat, receiving a second request from the second interface to view the portion of the first user profile that is blurred; prompting the first interface for permission to allow the portion of the first user profile that is blurred to be viewed on the second interface as unblurred; receiving a second approval from the first interface to allow the portion of the first user profile that is blurred to be viewed on the second interface as unblurred; and instructing the second interface to unblur the portion of the first user profile.

Aspect 5. The online matching method of any one of Aspects 1 to 4, further comprising: prior to determining that a negative preference regarding the first user profile of the first user has not been received from the second interface, receiving a positive preference regarding the first user profile from the second interface.

Aspect 6. The online matching method of any one of Aspects 1 to 5, further comprising: based on receiving a positive preference regarding the second user profile from the first interface, sending a notice to the first interface requesting whether the first interface wishes to unblur any portion of the first user profile.

Aspect 7. The online matching method of any one of Aspects 1 to 6, further comprising: upon receiving a positive preference regarding the first user profile from the second interface, sending a notice to the second interface requesting whether the first interface wishes to unblur the any portion of the second user profile.

Aspect 8. The online matching method of any one of Aspects 1 to 7, wherein the portion of the first user profile that is blurred is a first private card, wherein the portion of the second user profile that is blurred is a second private card.

Aspect 9. The online matching method of any one of Aspects 1 to 8, further comprising: receiving from the first interface a first private card request to blur the portion of the private card portion of the first user profile to all users, and blurring the portion of the first user private card profile when displayed on the second interface; receiving from the second interface a second private card request to blur the private card portion of the second user profile to all users, and blurring the private card portion of the second user profile when displayed on the first interface; or receiving from the first interface the first private card request to blur the private card portion of the first user private card profile to all users, blurring the private card portion of the first user profile when displayed on the second interface, receiving from the second interface the second private card request to blur the private card portion of the second user profile to all users, and blurring the private portion of the second user profile when displayed on the first interface.

Aspect 10. An online matching computer communicatively coupled to a first interface running on a first user device of a first user and a second interface running on a second user device of a second user, the online matching computer having one or more processors configured to: present a first plurality of user profiles to the first interface, wherein the first plurality of user profiles includes a second user profile of the second user, wherein a portion of the second user profile is blurred; present a second plurality of user profiles to the second interface, wherein the second plurality of user profiles includes a first user profile of the first user, wherein a portion of the first user profile is blurred; receive a negative preference regarding the second user profile of the second user from the first interface; determine that a negative preference regarding the first user profile of the first user has not been received from the second interface; based on the determining, instruct the first interface to display an in-app notification on the first user device, wherein the in-app notification indicates a first option for the first user to review the second user profile; receive an acceptance of the first option from the first interface; instruct the first interface to display a throwback page on the first user device, wherein the throwback page includes a third plurality of user profiles that include the second user profile still having at least a portion of the second user profile blurred; and receive a positive preference regarding the second user profile from the first interface.

Aspect 11. The online matching computer of Aspect 10, the one or more processors being further configured to: prompt the first interface and the second interface with a second option to initiate a chat between the first user and the second user; receive an acceptance of the second option from the first interface and from the second interface; and initiate the chat between the first user and the second user via the first interface and the second interface.

Aspect 12. The online matching computer of Aspect 10 or 11, the one or more processors being further configured to: administer the chat; during the chat, receive a first request from the first interface to view the portion of the second user profile that is blurred; prompt the second interface for permission to allow the portion of the second user profile that is blurred to be viewed on the first interface as unblurred; receive a first approval from the second interface to allow the portion of the second user profile that is blurred to be viewed on the first interface as unblurred; and instruct the first interface to unblur the portion of the second user profile.

Aspect 13. The online matching computer of any one of Aspects 10 to 12, the one or more processors being further configured to: during the chat, receive a second request from the second interface to view the portion of the first user profile that is blurred; prompt the first interface for permission to allow the portion of the first user profile that is blurred to be viewed on the second interface as unblurred; receive a second approval from the first interface to allow the portion of the first user profile that is blurred to be viewed on the second interface as unblurred; and instruct the second interface to unblur the portion of the first user profile.

Aspect 14. The online matching computer of any one of Aspects 10 to 13, the one or more processors being further configured to: prior to determining that a negative preference regarding the first user profile of the first user has not been received from the second interface, receive a positive preference regarding the first user profile from the second interface.

Aspect 15. The online matching computer of any one of Aspects 10 to 14, the one or more processors being further configured to: based on receiving a positive preference regarding the second user profile from the first interface, instruct the first interface to unblur the portion of the first user profile.

Aspect 16. The online matching computer of any one of Aspects 10 to 15, the one or more processors being further configured to: receive a positive preference regarding the first user profile from the second interface.

Aspect 17. The online matching computer of any one of Aspects 10 to 16, wherein the portion of the first user profile that is blurred is a first private card, wherein the portion of the second user profile that is blurred is a second private card.

Aspect 18. The online matching computer of any one of Aspects 10 to 17, the one or more processors being further configured to: receive from the first interface a first private mode request to blur the portion of the first user profile to all users, and blur the portion of the first user profile when displayed on the second interface; receive from the second interface a second private mode request to blur the portion of the second user profile to all users, and blur the portion of the second user profile when displayed on the first interface; or receive from the first interface the first private mode request to blur the portion of the first user profile to all users, blur the portion of the first user profile when displayed on the second interface, receive from the second interface the second private mode request to blur the portion of the second user profile to all users, and blur the portion of the second user profile when displayed on the first interface.

Aspect 19. An online matching method comprising: presenting a first plurality of user profiles to a first interface running on a first user device of a first user; presenting a second plurality of user profiles to a second user device of a second user, wherein the first plurality of user profiles includes a second user profile of the second user, wherein a portion of the second user profile is blurred, wherein the second plurality of user profiles includes a first user profile of the first user, wherein a portion of the first user profile is blurred; and upon occurrence of a condition, i) unblurring the portion of the second user profile on the first interface, ii) unblurring the portion of the first user profile on the second interface, or iii) unblurring the portion of the second user profile on the first interface and unblurring the portion of the first user profile on the second interface, or any or all of i; ii and iii.

Aspect 20. The method of Aspect 19, wherein the condition is selected from i) receiving a positive preference for the second user profile from the first interface after receiving a negative preference for the second user profile from the first interface, ii) receive a first request from the first interface to view the portion of the second user profile that is blurred, or iii) receive a second request from the second interface to view the portion of the first user profile that is blurred.

Aspect 21. A method comprising: granting by a first user, a second user access to private cards of the first user according to a technique disclosed herein.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. An online matching method comprising:
  presenting a first plurality of user profiles to a first interface running on a first user device of a first user;
  presenting a second plurality of user profiles to a second user device of a second user, wherein the first plurality of user profiles includes a second user profile of the second user, wherein a portion of the second user profile designated by the second user as private is indiscernibly blurred or otherwise rendered inaccessible without the second user allowing access, wherein the second plurality of user profiles includes a first user profile of the first user, wherein a portion of the first user profile designated by the first user as private is undiscernibly blurred or otherwise rendered inaccessible without the first user allowing access;

receiving a negative preference regarding the second user profile of the second user from the first interface;

determining that a negative preference regarding the first user profile of the first user has not been received from the second interface;

based on the determining, instructing the first interface to display an in-app notification on the first user device, wherein the in-app notification indicates a first option for the first user to review the second user profile;

receiving an acceptance of the first option from the first interface;

instructing the first interface to display a throwback page on the first user device, wherein the throwback page includes a third plurality of user profiles that include the second user profile still having at least a portion of the second user substantially indiscernibly blurred or otherwise rendered inaccessible; and receiving a positive preference regarding the second user profile from the first interface.

2. The online matching method of claim 1, further comprising:

prompting the first interface and the second interface with a second option to initiate a chat between the first user and the second user;

receiving an acceptance of the second option from the first interface and from the second interface; and initiating the chat between the first user and the second user via the first interface and the second interface.

3. The online matching method of claim 2, further comprising:

administering the chat;

during the chat, receiving a first request from the first interface to view the portion of the second user profile that is indiscernibly blurred or otherwise rendered inaccessible;

prompting the second interface for permission to allow the portion of the second user profile that is indiscernibly blurred or otherwise rendered inaccessible to be viewed on the first interface as unblurred or otherwise accessible;

receiving a first approval from the second interface to allow the portion of the second user profile that is indiscernibly blurred or otherwise rendered inaccessible to be viewed on the first interface as unblurred or otherwise accessible; and instructing the first interface to unblur or otherwise render accessible the portion of the second user profile previously indiscernibly blurred or otherwise rendered inaccessible.

4. The online matching method of claim 3, further comprising:

during the chat, receiving a second request from the second interface to view the portion of the first user profile that is indiscernibly blurred or otherwise rendered inaccessible;

prompting the first interface for permission to allow the portion of the first user profile that is indiscernibly blurred or otherwise rendered inaccessible to be viewed on the second interface as unblurred or otherwise accessible;

receiving a second approval from the first interface to allow the portion of the first user profile that is indiscernibly blurred or otherwise inaccessible to be viewed on the second interface as unblurred or otherwise accessible; and instructing the second interface to unblur or otherwise render accessible the portion of the first user profile previously indiscernibly blurred or otherwise rendered inaccessible.

5. The online matching method of claim 1, further comprising:

prior to determining that a negative preference regarding the first user profile of the first user has not been received from the second interface, receiving a positive preference regarding the first user profile from the second interface.

6. The online matching method of claim 1, further comprising:

based on receiving a positive preference regarding the second user profile from the first interface, sending a notice to the first interface requesting whether the first interface wishes to unblur or otherwise render accessible any portion of the first user profile.

7. The online matching method of claim 1, further comprising:

based on receiving a positive preference regarding the first user profile from the second interface, sending a notice to the second interface requesting whether the second interface wishes to unblur or otherwise render accessible any portion of the first user profile, that is indiscernibly blurred or otherwise rendered inaccessible.

8. The online matching method of claim 1, wherein the portion of the first user profile that is indiscernibly blurred or otherwise rendered inaccessible is a first private card, wherein the portion of the second user profile that is indiscernibly blurred or otherwise rendered inaccessible is a second private card.

9. The online matching method of claim 1, further comprising:

receiving from the first interface a first private card mode request to blur or otherwise render inaccessible the private card portion of the first user profile to all users, and blurring or otherwise rendering inaccessible the private card portion of the first user profile when displayed on the second interface;

receiving from the second interface a second private card mode request to blur or otherwise render inaccessible the private card portion of the second user's profile to all users, and blurring or otherwise rendering inaccessible the private card portion of the second user profile when displayed on the first interface; or receiving from the first interface the first private card mode request to blur or otherwise render inaccessible the private card portion of the first user profile to all users, blurring or otherwise rendering inaccessible the private card portion of the first user profile when displayed on the second interface, receiving from the second interface the second private card mode request to blur or otherwise render inaccessible the private card portion of the second user profile to all users, and blurring or otherwise rendering inaccessible the private card portion of the second user profile when displayed on the first interface.

10. The online matching method of claim 1, further comprising:

displaying a first user's profile photograph that was at least partially blurred but not indiscernibly blurred as unblurred to the second user among a plurality of other user's profile photographs, which are partially blurred, when the server determines that a predetermined condition for the system to automatically remove the blurring for the first user's profile photograph is met.

11. The online matching method of claim 10, wherein the predetermined condition is that a certain period of time has passed without the first user having received a positive preference.

12. An online matching computer communicatively coupled to a first interface running on a first user device of a first user and a second interface running on a second user device of a second user, the online matching computer having one or more processors configured to:

present a first plurality of user profiles to the first interface, wherein the first plurality of user profiles includes a second user profile of the second user, wherein a portion of the second user profile is indiscernibly blurred or otherwise rendered inaccessible;

present a second plurality of user profiles to the second interface, wherein the second plurality of user profiles includes a first user profile of the first user, wherein a portion of the first user profile is indiscernibly blurred or otherwise rendered inaccessible;

receive a negative preference regarding the second user profile of the second user from the first interface;

determine that a negative preference regarding the first user profile of the first user has not been received from the second interface;

based on the determining, instruct the first interface to display an in-app notification on the first user device, wherein the in-app notification indicates a first option for the first user to review the second user profile;

receive an acceptance of the first option from the first interface;

instruct the first interface to display a throwback page on the first user device, wherein the throwback page includes a third plurality of user profiles that include the second user profile still having at least a portion of the second user profile that is indiscernibly blurred or otherwise rendered inaccessible; and receive a positive preference regarding the second user profile from the first interface.

13. The online matching computer of claim 12, the one or more processors being further configured to:

prompt the first interface and the second interface with a second option to initiate a chat between the first user and the second user;

receive an acceptance of the second option from the first interface and from the second interface; and initiate the chat between the first user and the second user via the first interface and the second interface.

14. The online matching computer of claim 13, the one or more processors being further configured to:

administer the chat;

during the chat, receive a first request from the first interface to view the portion of the second user profile that is indiscernibly blurred or otherwise rendered inaccessible;

prompt the second interface for permission to allow the portion of the second user profile that is indiscernibly blurred or otherwise rendered inaccessible to be viewed on the first interface as unblurred or otherwise accessible;

receive a first approval from the second interface to allow the portion of the second user profile that is indiscernibly blurred or otherwise inaccessible to be viewed on the first interface as unblurred or otherwise accessible; and instruct the first interface to unblur or otherwise render accessible the portion of the second user profile.

15. The online matching computer of claim 14, the one or more processors being further configured to:

during the chat, receive a second request from the second interface to view the portion of the first user profile that is indiscernibly blurred or otherwise inaccessible;

prompt the first interface for permission to allow the portion of the first user profile that is indiscernibly blurred or otherwise inaccessible to be viewed on the second interface as unblurred or otherwise accessible;

receive a second approval from the first interface to allow the portion of the first user profile that is indiscernibly blurred or otherwise rendered inaccessible to be viewed on the second interface as unblurred or otherwise accessible; and instruct the second interface to unblur or otherwise render accessible the portion of the first user profile.

16. The online matching computer of claim 12, the one or more processors being further configured to:

prior to determining that a negative preference regarding the first user profile of the first user has not been received from the second interface, receive a positive preference regarding the first user profile from the second interface.

17. The online matching computer of claim 12, the one or more processors being further configured to:

based on receiving a positive preference regarding the second user profile from the first interface, instruct the first interface to unblur or otherwise render accessible the portion of the first user profile that is indiscernibly blurred or otherwise inaccessible.

18. The online matching computer of claim 12, the one or more processors being further configured to:

receive a positive preference regarding the first user profile from the second interface.

19. The online matching computer of claim 12, wherein the portion of the first user profile that is indiscernibly blurred or otherwise rendered inaccessible is a first private card, wherein the portion of the second user profile that is indiscernibly blurred or otherwise rendered inaccessible is a second private card.

20. The online matching computer of claim 12, the one or more processors being further configured to:

receive from the first interface a first private mode request to blur the portion of the first user profile to all users, and indiscernibly blur or otherwise render inaccessible the portion of the first user profile when displayed on the second interface;

receive from the second interface a second private mode request to blur the portion of the second user profile to all users, and indiscernibly blur or otherwise render inaccessible the portion of the second user profile when displayed on the first interface; or receive from the first interface the first private mode request to blur the portion of the first user profile to all users, indiscernibly blur or otherwise render inaccessible the portion of the first user profile when displayed on the second interface, receive from the second interface the second private mode request to blur the portion of the second user profile to all users, and indiscernibly blur or otherwise render inaccessible the portion of the second user profile when displayed on the first interface.

21. The online matching computer of claim 12, the one or more processors being further configured to:

display the first user's profile photograph that was at least partially blurred but not indiscernibly blurred as unblurred to the second user among a plurality of other user's profile photographs, which are partially blurred, when the server determines that a predetermined condition for the system to automatically remove the partial blurring for first user's profile photograph has been met.

22. An online matching method, comprising:

presenting a first plurality of user profiles to a first interface running on a first user device of a first user;

presenting a second plurality of user profiles to a second user device of a second user, wherein the first plurality of user profiles includes a second user profile of the second user, wherein a portion of the second user profile is blurred, wherein the second plurality of user profiles includes a first user profile of the first user, wherein a portion of the first user profile is blurred; and upon occurrence of a predetermined condition, i) unblurring the portion of the second user profile on the first interface, ii) unblurring the portion of the first user profile on the second interface, or iii) unblurring the portion of the second user profile on the first interface and unblurring the portion of the first user profile on the second interface, wherein the condition is selected from i) receiving a positive preference for the second user profile from the first interface after receiving a negative preference for the second user profile from the first interface, ii) receiving a first request from the first interface to view the portion of the second user profile that is blurred, or iii) receiving a second request from the second interface to view the portion of the first user profile that is blurred; and wherein the predetermined condition is that a certain period of time has passed without the at least one user having received a positive preference.

23. An online matching method comprising:

presenting a first plurality of user profiles to a first interface running on a first user device of a first user;

presenting a second plurality of user profiles to a second user device of a second user, wherein the first plurality of user profiles includes a second user profile of the second user, wherein a portion of the second user profile is blurred, wherein the second plurality of user profiles includes a first user profile of the first user, wherein a portion of the first user profile is blurred;

upon occurrence of a predetermined condition, i) unblurring the portion of the second user profile on the first interface, ii) unblurring the portion of the first user profile on the second interface, or iii) unblurring the portion of the second user profile on the first interface and unblurring the portion of the first user profile on the second interface;

where at least one user's profile photograph is displayed on the screen of other users' devices as partially blurred, the amount of partial blurring being not so extensive as to render the photograph undiscernible; and displaying the at least one user's profile photograph as unblurred to a second user among a plurality of other user's profile photographs which are partially blurred, when the server determines that the predetermined condition for the system to automatically remove the partial blurring for the at least one user has been met, wherein the predetermined condition is that a certain period of time has passed without the at least one user having received a positive preference.

* * * * *